US011226962B2

(12) United States Patent
Lautenschlaeger et al.

(10) Patent No.: US 11,226,962 B2
(45) Date of Patent: Jan. 18, 2022

(54) EFFICIENT EVENT CORRELATION IN A STREAMING ENVIRONMENT

(71) Applicant: SAP SE, Walldorf (DE)

(72) Inventors: Benjamin Lautenschlaeger, Walldorf (DE); Zoltan Albrecht, Walldorf (DE)

(73) Assignee: SAP SE, Walldorf (DE)

( * ) Notice: Subject to any disclaimer, the term of this patent is extended or adjusted under 35 U.S.C. 154(b) by 764 days.

(21) Appl. No.: 16/153,427

(22) Filed: Oct. 5, 2018

(65) Prior Publication Data

US 2020/0110826 A1    Apr. 9, 2020

(51) Int. Cl.
*G06F 16/2453* (2019.01)
*G06F 16/2455* (2019.01)
*G06F 9/54* (2006.01)

(52) U.S. Cl.
CPC ........ *G06F 16/24539* (2019.01); *G06F 9/542* (2013.01); *G06F 16/24537* (2019.01); *G06F 16/24556* (2019.01); *G06F 16/24568* (2019.01)

(58) Field of Classification Search
None
See application file for complete search history.

(56) References Cited

U.S. PATENT DOCUMENTS

| 6,654,387 | B1* | 11/2003 | Beser | H04L 12/2801 370/485 |
| 8,166,351 | B2* | 4/2012 | Slutsman | G06F 11/079 714/48 |
| 2010/0280882 | A1* | 11/2010 | Faith | G06Q 20/4016 705/7.37 |
| 2014/0297821 | A1* | 10/2014 | Lvin | H04L 41/064 709/223 |
| 2016/0360382 | A1* | 12/2016 | Gross | G06F 3/0488 |
| 2017/0017368 | A1* | 1/2017 | Maheshwari | G06F 3/0484 |

(Continued)

OTHER PUBLICATIONS

OpenRTB (Real-Time Bidding). Open RTB 3.0 Beta Launch. 2016. Article can be retrieved at: https://www.iab.com/guidelines/real-time-bidding-rtb-project/.

(Continued)

*Primary Examiner* — Robert W Beausoliel, Jr.
*Assistant Examiner* — Cheryl M Shechtman
(74) *Attorney, Agent, or Firm* — Fountainhead Law Group P.C.

(57) ABSTRACT

In a streaming environment, efficient correlation between base events and relevant follow-on events is accomplished by temporarily storing events in an in-memory state for a limited time window. The in-memory state buffers the incoming stream of events to permit efficient attempted correlation. Successful correlation (e.g., by ID matching) between a follow-on event and a relevant base event, gives rise to specialized aggregation tables for matched (base, follow-on) event pairs. All events are ultimately removed from the in-memory state upon expiry of the time window. This results in correlated matched event pairs being stored in the aggregation tables for efficient querying. Events remaining uncorrelated upon expiration of the time window, are stored only in an (voluminous) log table for less-efficient (but rare) late querying and aggregation. Efficient correlation is achieved by assuming that successful event pair matching is most likely to occur within the in-memory time window, or not at all.

20 Claims, 12 Drawing Sheets

(56) References Cited

U.S. PATENT DOCUMENTS

2017/0046127 A1* 2/2017 Fletcher ............... H04L 41/069
2017/0126542 A1* 5/2017 Dong .................... H04L 41/12
2017/0242889 A1* 8/2017 Zhao .................... G06F 16/283

OTHER PUBLICATIONS

Class StateSpec; retrieved from https://spark.apache.org/docs/1.6.2/api/java/org/apache/spark/streaming/StateSpec.html; printed on Oct. 4, 2018.

* cited by examiner

- Ad Request
  - AdspaceID, InventoryID, Creative, Campaign, AdrequestID
  - Device: Make, Model, OS, Version
  - User, Gender, Latitude, Longitude, Country, UserAgent
  - ...

- Events
  Impressions (< seconds)
  Clicks (~ minutes)
  Conversions (~ days)
  - AdrequestID, Timestamp

FIG. 3

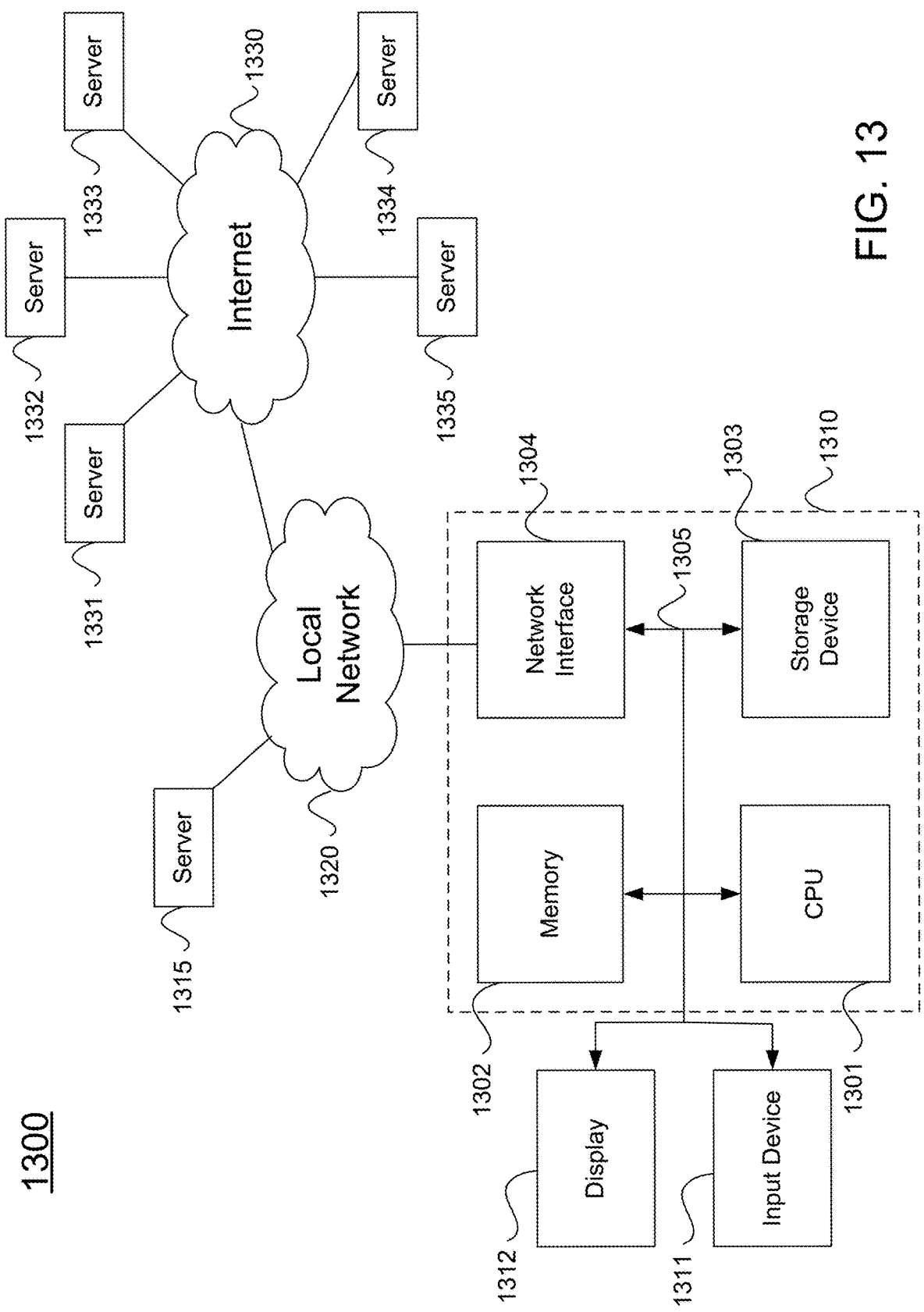

EFFICIENT EVENT CORRELATION IN A STREAMING ENVIRONMENT

BACKGROUND

Unless otherwise indicated herein, the approaches described in this section are not prior art to the claims in this application and are not admitted to be prior art by inclusion in this section.

In the current landscape of information technology, systems may emit very large volumes of data. Examples of such systems include the Internet of Things (IoT), and other global web-based services such as digital advertising.

In addition to issues arising from the intake of such sheer data volumes, the timely processing of the incoming data may also pose a challenge. Absent efficient data processing procedures, the implementation of a large data handling system can easily become uneconomical and unprofitable.

For example, data processing by certain systems may seek to correlate an incoming event, with one previously handled. Thus a digital advertising system may seek to correlate a subsequent follow-on user action (e.g., a user clicking on an advertisement), with an original base event (e.g., the initial offering of that advertisement). Such correlation activities can be difficult to accomplish efficiently in the face of receiving large streams (e.g., billions) of incoming events.

SUMMARY

In a streaming environment, efficient correlation between base events and relevant follow-on events is accomplished by temporarily storing events in an in-memory state for a limited time window. The in-memory state buffers the incoming stream of events to permit efficient attempted correlation. Successful correlation (e.g., by ID matching) between a follow-on event and a relevant base event, gives rise to formation of specialized aggregation tables for matched (base, follow-on) event pairs. All events are ultimately removed from the in-memory state upon expiry of the time window. Thus correlated event pairs are stored in the aggregation tables for efficient querying. Events remaining uncorrelated upon expiration of the time window, are stored only in an (voluminous) log table for less-efficient (but rare) late querying and aggregation. Efficient correlation is achieved by assuming that successful event pair matching is most likely to occur within the in-memory time window, or not at all.

An embodiment of a computer-implemented method comprises an engine receiving at a first time, a base event. The engine stores the base event in a log table of a persistence layer, and stores the base event in an in-memory state. The engine receives at a second time after the first time, a first follow-on event. The engine stores the first follow-on event in the log table, and stores the first follow-on event in the in-memory state. Within a predetermined time period, the engine correlates the follow-on event as relevant to the base event to create an event pair. The engine stores an aggregation table comprising the base event and the follow-on event as the event pair. After expiry of the predetermined time period, the engine deletes the base event and the follow-on event from the in-memory state. The engine satisfies a query with reference to the aggregation table.

A non-transitory computer readable storage medium embodies a computer program for performing a method comprising an engine receiving at a first time, a base event including an identifier. The engine stores the base event in a log table of a persistence layer. The engine stores the base event in an in-memory state. The engine receives at a second time after the first time, a first follow-on event including the identifier. The engine stores the first follow-on event in the log table, and stores the first follow-on event in the in-memory state. Within a predetermined time period, the engine correlates the follow-on event as relevant to the base event to create an event pair by matching the identifier in the base event with the identifier in the first follow-on event. The engine stores an aggregation table comprising the base event and the follow-on event as the event pair. After expiry of the predetermined time period, the engine deletes the base event and the follow-on event from the in-memory state. The engine satisfies a query with reference to the aggregation table.

An embodiment of a computer system comprises one or more processors and a software program, executable on said computer system. The software program is configured to cause an in-memory database engine to receive at a first time, a base event. The software program is configured to cause the in-memory database engine to store the base event in a log table of a persistence layer, and to store the base event in an in-memory state within an in-memory database. The engine receives at a second time after the first time, a first follow-on event. The software program is configured to cause the in-memory database engine to store the first follow-on event in the log table, and to store the first follow-on event in the in-memory state. Within a predetermined time period, the engine correlates the follow-on event as relevant to the base event to create an event pair. The engine stores an aggregation table comprising the base event and the follow-on event as the event pair. After expiry of the predetermined time period, the engine deletes the base event and the follow-on event from the in-memory state. The engine satisfies a query with reference to the aggregation table.

According to certain embodiments the correlating comprises the engine matching an identifier in the base event with the identifier in the first follow-on event.

In some embodiments the base event comprises a first time stamp, and the follow-on event comprises a second time stamp.

In particular embodiments the predetermined time is calculated from the first time stamp.

According to various embodiments, the base event and the first follow-on event are received from an ingestion layer, and a method further comprises the engine receiving at a third time after expiry of the predetermined time, a second follow-on event from the ingestion layer. The engine stores the second follow-on event in the log table, and stores the second follow-on event in the in-memory state. The engine recognizes the second follow-on event as relevant to the base event, and forwards the second follow-on event back to the ingestion layer. The engine receives the second follow-on event as a different job from the ingestion layer, and the engine satisfies the query with further reference to the log table.

In certain embodiments the correlating comprises the engine matching an identifier in the base event with the identifier in the first follow-on event, the second follow-on event includes the identifier, and the engine recognizes the second follow-on event as relevant to the base event due to the identifier.

In some embodiments the aggregation table is stored in the persistence layer.

According to particular embodiments the in-memory state is in an in-memory database outside the persistence layer.

According to certain embodiments the engine is an in-memory database engine.

In various embodiments the base event comprises an initial reading from an Internet-of-Things (IoT) sensor, and the first follow-on event comprises a subsequent reading from the IoT sensor.

The following detailed description and accompanying drawings provide a better understanding of the nature and advantages of various embodiments.

BRIEF DESCRIPTION OF THE DRAWINGS

FIG. 3 shows a simplified view of data format and characteristics of various digital advertising events.

FIG. 13 illustrates an example computer system.

DETAILED DESCRIPTION

Described herein are methods and apparatuses implementing event correlation in a streaming environment. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

In a streaming environment, efficient correlation between base events and relevant follow-on events is accomplished by temporarily storing events in an in-memory state for a limited time window. The in-memory state buffers the incoming stream of events to permit efficient attempted correlation. Successful correlation (e.g., by ID matching) between a follow-on event and a relevant base event, gives rise to specialized aggregation tables for matched (base, follow-on) event pairs. All events are ultimately removed from the in-memory state upon expiry of the time window. This results in correlated matched event pairs being stored in the aggregation tables for efficient querying. However, events remaining uncorrelated upon expiration of the time window, are stored only in an (voluminous) log table for less-efficient (but rare) late querying and aggregation. Efficient correlation is achieved by assuming that successful event pair matching is most likely to occur within the in-memory time window, or not at all.

Figure 1:
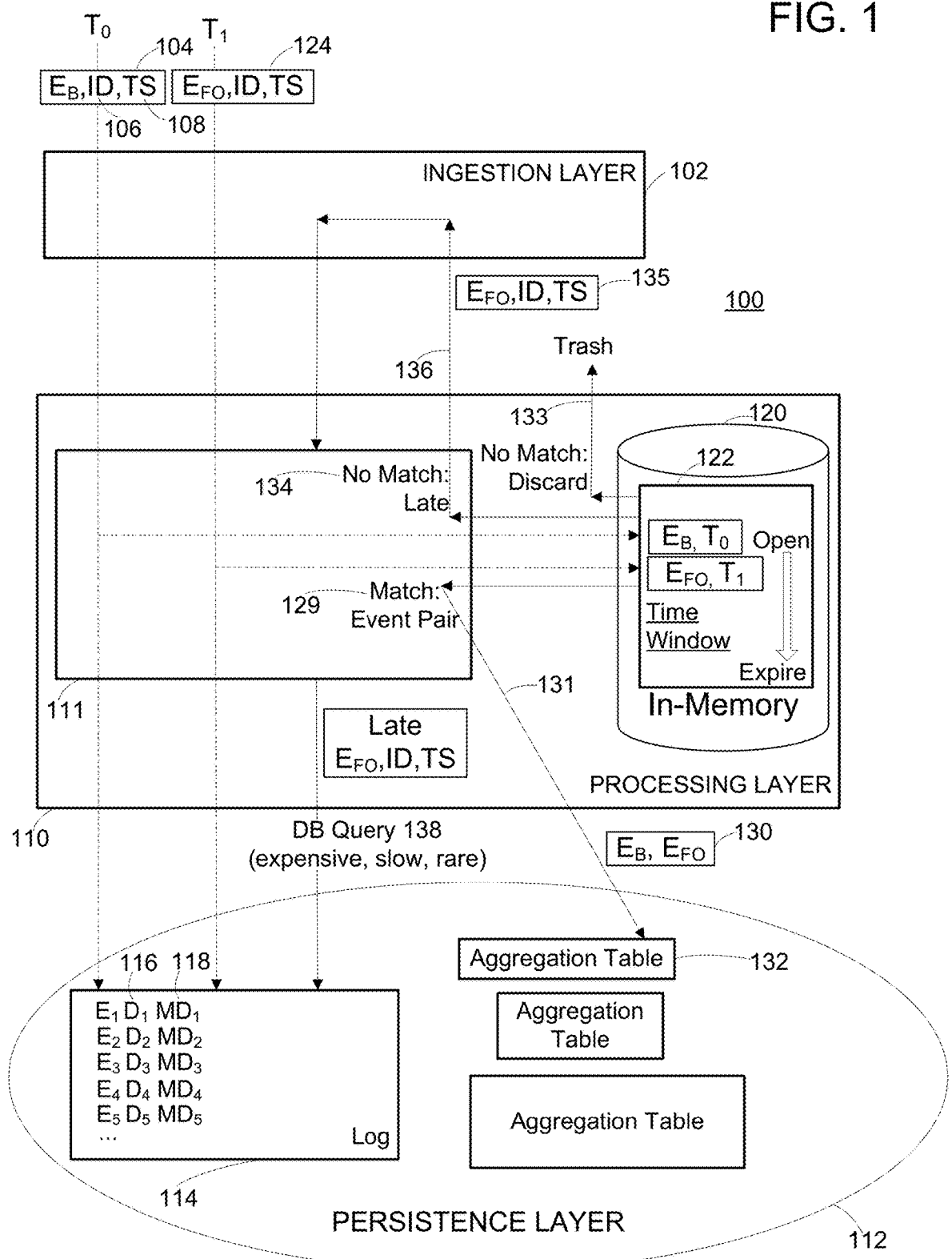
FIG. 1 shows a simplified diagram of a system according to an embodiment.

FIG. 1 shows a simplified view of an example system that is configured to implement event correlation according to an embodiment. Specifically, system 100 comprises an ingestion layer 102 receiving from an outside source at an original time $T_0$, a base event (EB) 104 including an identifier (ID) 106, and a timestamp (TS) 108. One possible example of such a base event, could be an initial ad request that is received from a digital advertising server.

The ingestion layer forwards the base event to the processing layer 110. An engine 111 of the processing layer causes the base event (and indeed all events $E_n$ that are received), to be saved in persistence layer 112. In particular, the events are stored in a (voluminous) log table 114 that includes data ($D_n$) 116 of the event, as well as metadata ($MD_n$) 118 associated with that event. Here, continuing with a particular example involving digital advertising, that metadata could comprise a particular country (e.g., Germany) in which the advertising response is sent.

As previously indicated, the sheer size of the log table of the persistence layer may be enormous, comprising millions or even billions of individual records. The tremendous volume can result in querying of the log table being a relatively difficult, expensive, and slow process.

Accordingly, in order to enhance the efficiency of the data streaming process, FIG. 1 shows the engine also temporarily storing the base event in an in-memory state 120. In particular, the in-memory state comprises a limited time window 122 that is calculated from the timestamp of the incoming (base) event. The duration of the time window may be dictated by various factors, including but not limited to a capacity of the in-memory storage of the processing layer, and/or a present or predicted volume of incoming events.

A key functionality of the streaming system is to accurately and efficiently correlate the base event with any relevant subsequent follow-on event ($E_{FO}$) that is received. In the digital advertising context, a follow-on event to an advertising request could be receiving an impression of the ad request (e.g., that the ad request was not blocked).

Thus, FIG. 1 further shows the ingestion layer receiving at a subsequent time $T_1$, a second (follow-on) event 124. That follow-on event includes an identifier and a time stamp.

Again, the ingestion layer forwards the $E_{FO}$ to the processing layer, and thence to storage in the log table of the underlying persistence layer. And, the engine of the ingestion layer also forwards the $E_{FO}$ to the in-memory state for temporary storage for as long as the pre-determined time window.

Next, within the time window calculated from the base event, the engine of the processing layer references the in-memory state in an effort to match 129 that base event to the follow-on event. According to certain embodiments this matching may be performed on the basis of a same identifier being common to the base event and to the follow-on event.

Where the engine successfully recognizes a match between the base event and the follow-on event within the time window, an event pair 130 is created. That event pair comprises the base event and the follow-on event. Data (including metadata) of the event pair is then aggregated and stored 131 within a smaller, specialized aggregation table 132.

Upon expiration of the time window, each of the base event and the matching follow-on event are removed 133 from the in-memory state. This deletion of data conserves the limited capacity of the in-memory state, freeing space to perform ongoing event pair matching.

Of course, it is possible that no follow-on event relevant to the base event, may actually be received within the time window. This could occur, for example, where an advertisement request is blocked such that not even an impression event is received.

Under such circumstances the original base event and any (non-matched) follow-on events naturally expire at the conclusion of the time window, and are removed from the in-memory state.

In this manner, the in-memory state essentially serves as a temporary buffer for a continuous stream of incoming (base, follow-on) events that are stored within a limited time window. Successful matching of relevant base/follow-on event pairs within that limited time window permits efficient formation of specialized aggregation tables. Ultimately, all events (matched and un-matched; base and follow-on) are invariably removed from the in-memory state upon expiry of the time window. As a result, matched event pairs remain stored in aggregation tables for efficient querying. Unmatched events (base, follow-on) are stored only in an (voluminous) log table within the persistence layer, a format that is not particularly amenable to rapid and efficient querying.

Here, an underlying assumption to realize efficient event streaming, is that any event pair matching is highly likely to occur within the limited time window. In the vast majority of cases successful event pair matching will either occur within the limited time window, or will not occur at all.

In a (small) minority of cases, a relevant follow-on event may be received only after the time window has already expired, and the correlated base event has accordingly already been deleted from the in-memory state. The engine is configured to recognize 134 such a (rare) late incoming event 135, and in response push 136 that late follow-on event back into the ingestion layer for special handling.

Such special handling may involve querying 138 the underlying log table in order to correlate the late follow-on event with its relevant base event. While having to perform an aggregation operation (e.g. join) upon such a voluminous log table can be a slow and expensive process, this is expected to be an infrequent occurrence.

The particular embodiment of FIG. 1 shows aggregation table(s) as being stored in the persistence layer. However, this is not required. Alternative embodiments could store aggregation tables outside of the persistence layer. For example, where the in-memory state is provided by an in-memory database (such as the SAP HANA in-memory database), one or more of the aggregation tables could be stored in the in-memory database itself.

Figure 2:
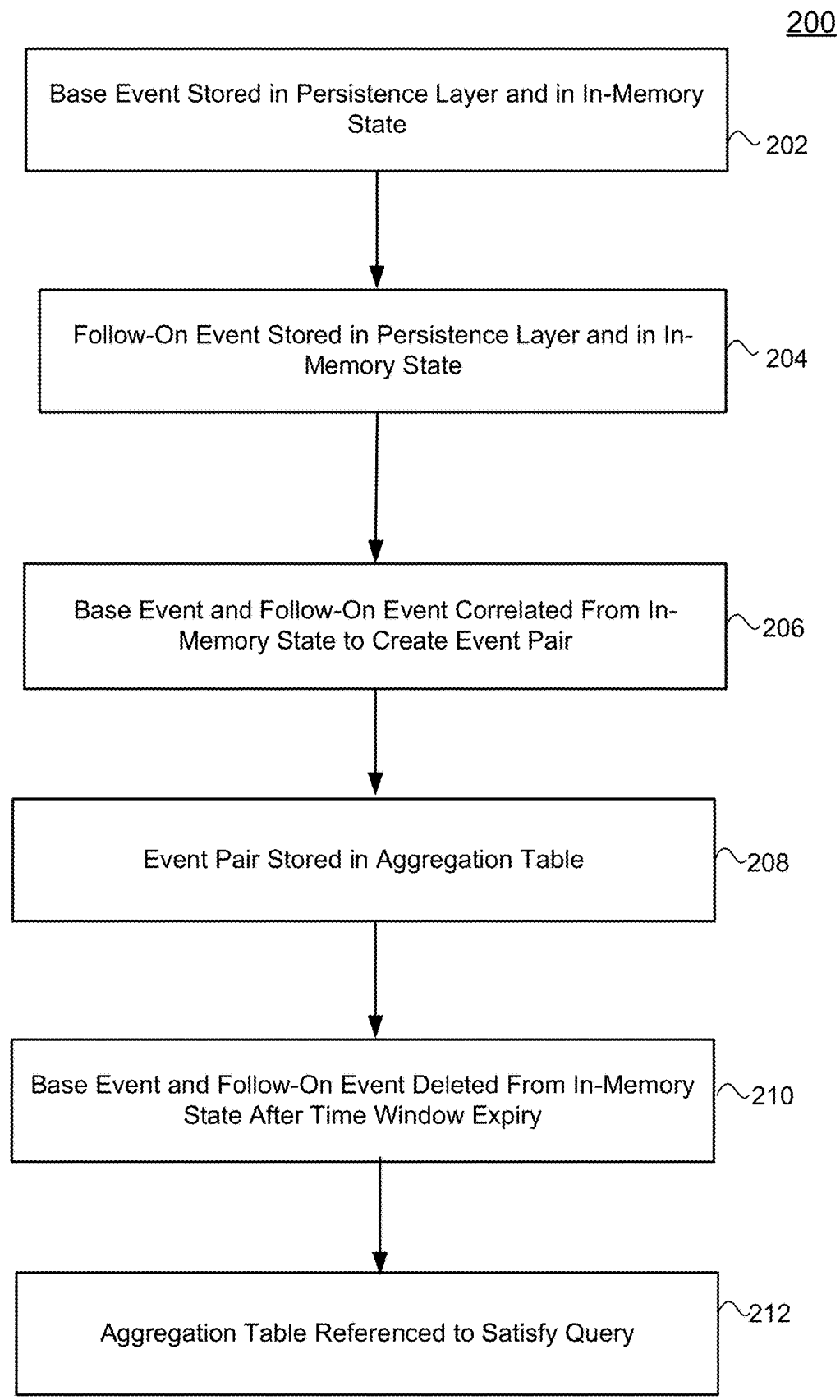
FIG. 2 shows a simplified flow diagram of a method according to an embodiment.

FIG. 2 is a flow diagram showing various actions taken in a method 200 according to an embodiment. At 202, an engine stores a received base event in a log table of a persistence layer, and in an in-memory state. At 204 the engine stores a received follow-on event in the log table, and in the in-memory state.

At 206, within a predetermined time period the engine references the in-memory state to correlate the follow-on event as relevant to the base event and create an event pair. At 208 the engine stores an aggregation table comprising the base event and the follow-on event as an event pair.

At 210, after expiry of the predetermined time period, the engine deletes the base event and the follow-on event from the in-memory state. At 212, the engine satisfies a query with reference to the aggregation table.

Specific details regarding efficient event correlation in a streaming environment, are now provided in connection with an example regarding digital advertising.

EXAMPLE

The following describes a simplified event flow in digital advertisement:
1. A user visits a web page on which there is at least one location where an advertisement is displayed. During loading of the web page, an Ad Request is sent to the ad providing system (also referred to here as Adserving). The ad providing system answers with a link to an advertisement (e.g., creative, rich media creative, video, others) which then can be displayed on the web page. This sending of the Ad Request comprises a base event.
2. The user loads the advertisement. A Impression/View event is sent to the ad providing system. This Impression/View event comprises a follow-on event.
3. If the user is sufficiently interested, the user clicks on the advertisement on the web page. Under these circumstances, a Click event is sent to the ad providing system. This Click event comprises a follow-on event.
4. If the user acts upon the advertisement (e.g., ends up purchasing the advertised product), a Conversion event is issued to the ad providing system. That Conversion event also comprises a follow-on event.

FIG. 3 shows a simplified view of the data format and characteristics of the various events just described. The base (the Ad Request) event includes meta information (e.g. campaign information, user data, others). However, the follow-on events include only an ID and a timestamp. That ID is used to link the follow-on events to the base event with meta data.

The time elapsing between the different events is not predefined, and may vary according to user behavior. For example, the time between the Ad Request (base event) and the Impression (follow-on) event may comprise only milliseconds. Typically, the Click (follow-on) event occurs in the subsequent seconds or minutes. A Conversion (follow-on) event may be tracked after occurs even weeks later.

Digital advertising data that is gathered from follow-up events may be useful in a variety of contexts. Examples include but are not limited to:
(near real-time) Analytics;
fraud detection;
recommender engine;
bidding optimization;
click-through prediction;
conversion prediction; and
others.

Each of these potential use cases for digital advertising data, have in common that the individual follow-on events (e.g., impression, click, conversion) is to be linked to the base event to be processed further.

In the context of digital advertisement, and especially in the realm of Real Time Bidding (OpenRTB), the data volumes reaching the system are relatively high. For example, typical systems reach between 10,000 and 100,000 requests per second. This adds up to multiple billion requests each day. Accordingly, it is desirable that a digital advertising processing system be flexible in adapting to high loads.

The digital advertising use cases mentioned above have in common, that the faster the data is analyzed, the more valuable it is. In particular, advertising earnings can be measured in Cost Per Mille (CPM)–cost per 1000 advertising impressions.

For a thousand advertising impressions, advertisers may typically pay in the low single digit dollar range (e.g., $1-5). Because of this low earnings per event, such advertising impressions need to be processed in relatively low cost manner. Absent such cost-efficiency, the digital advertising system may become unprofitable.

To address the issue of huge volumes of advertising data being ingested into the system, it is desirable that each component of the processing pipeline itself be scalable.

Figure 4:
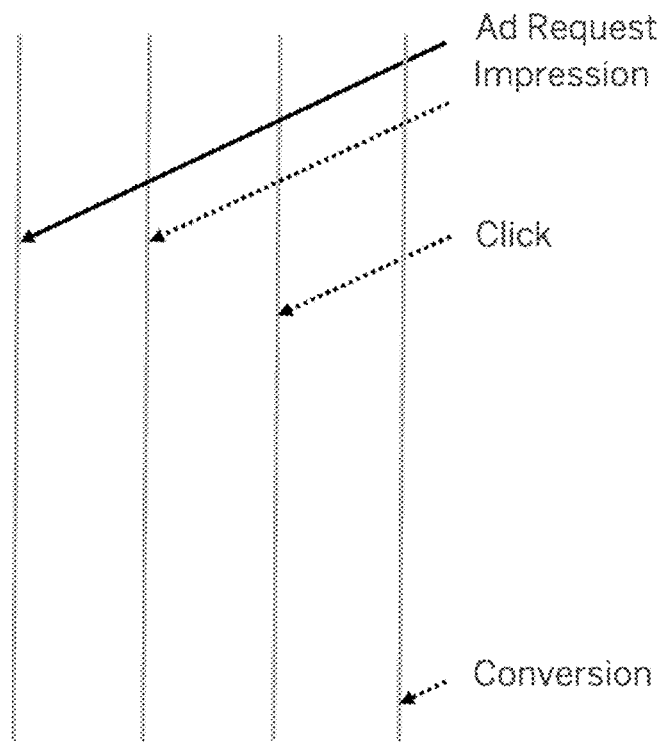
FIG. 4 shows a simplified view of the ingestion of advertising events by the messaging system of an exemplary digital advertising system.

Thus according to this particular example, the ingestion layer is based upon KAFKA clustered messaging system for high throughput which available from Apache. Each event that is received by the system is pushed asynchronously to the KAFKA messaging system into a separate channel (topic). FIG. 4 shows a simplified view of the ingestion of advertising events by the KAFKA messaging system.

Processing of the massive amounts of ingested digital advertising data, can be performed by Apache SPARK in this particular example. SPARK is a fast and general large-scale data processing framework. Details regarding operation of the SPARK processing layer in the context of this example, are provided below.

Finally, Apache CASSANDRA is a good choice as a persistence layer. CASSANDRA is a distributed database that is widely available and which is proven to easily scale linearly (up to petabytes) with the cluster size.

Returning to the processing layer, batch processing is one approach to handing huge data volumes. This involves writing batch jobs which crawl in defined time periods through the entire data.

An alternative data processing approach is streaming. Streaming tackles the timeliness problem by already processing the data in-flight, directly when it hits the system. Apache Spark supports both batch and streaming approaches.

Given the large data volumes ingested on a regular basis, accurate and efficient correlation (of follow-on events back to relevant base events), may offer a challenge to developers. At least two options may be possible to address the event correlation issue.

For a database lookup option, each base event (Ad Request) ingested by the system, is persisted into the distributed database. Each follow-on event (e.g., impression, click, conversion) is joined in near real-time with the base event stored in the database.

For an in-memory join option, each base event (Ad Request) ingested by the system is saved in an in-memory state. Each follow-on event (e.g., impression, click, conversion) is mapped in near real-time with the base event stored in-memory.

The various combinations between batch/streaming and database lookup/in-memory may offer benefits and challenges. For batch processing, database operations can desirably be combined, as not every event needs its own join-operation. However, batch processing exhibits some latency, which may interfere with near real-time analysis. This latency can depend upon the batch scheduling (sometimes in the range of one day).

Stream processing approaches offer their own possible benefits/drawbacks. For example, streaming+NoSQL database lookups are faster than batch processing, with lower latency allowing possible near real-time analysis. However, performing database lookups on every event can be expensive, consuming large amounts of CPU and I/O resources.

Similarly, a stream processing approach with in-memory window/state is faster than batch processing, offering lower latency and analysis times approaching real-time. However, stream processing with an in-memory window can call for creating a sufficient in-memory state to store all relevant events over time. These elapsed times from the base even can be several hours or even weeks in the case of conversion events. Accordingly, such approaches may consume large amounts of memory.

Accordingly, embodiments address correlation efficiency by combining database lookup and in-memory window approaches. In this example, a SPARK job an in-memory window is created. This SPARK job stores the incoming base events in the memory of each SPARK executor/node.

The size of the in-memory window is chosen depending on the amount of data ingested into the system. Arriving events are linked (without any further I/O) against base events.

The information that is needed for the use case (e.g., Analytics) is then retrieved from the event pair (follow-on event correlated to base event), processed, and then stored. This event-pair relevant information is stored in a data structure amenable to rapid querying (e.g., as one row in a database).

Under certain circumstances, a base event may not be already stored in an in-memory state. Only under these conditions does a separate database query need to promulgated and executed for purposes of the information lookup—a relatively slow activity.

Figure 5:
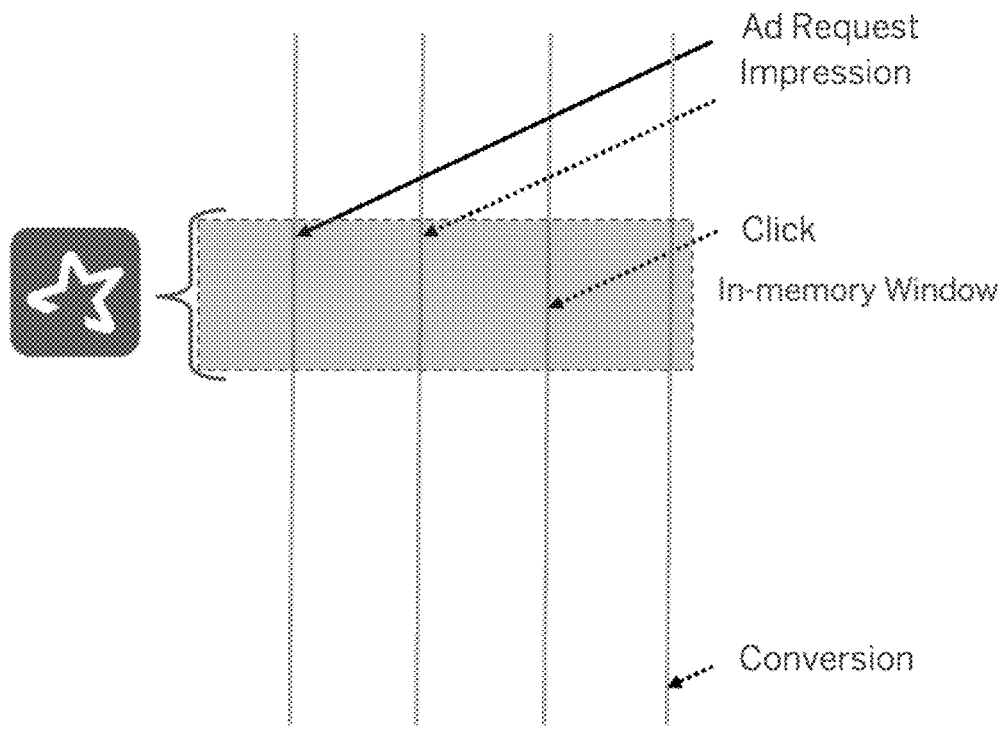
FIG. 5 is a simplified diagram summarizing the combination of an in-memory window for fast events, and database lookups for slow events.

FIG. 5 is a simplified diagram summarizing the combination of an in-memory window for fast events, and database lookups for slow events.

In particular, embodiments recognize that every Impression follow-on event usually arrives only a couple of milliseconds later than the corresponding base event. Also, the majority of Click follow-on events can be processed with the information stored in-memory. Accordingly, embodiments implement in-memory storage of follow-on event information for pre-determined time windows only, to reduce the memory burden and enhance efficiency.

Figure 6:
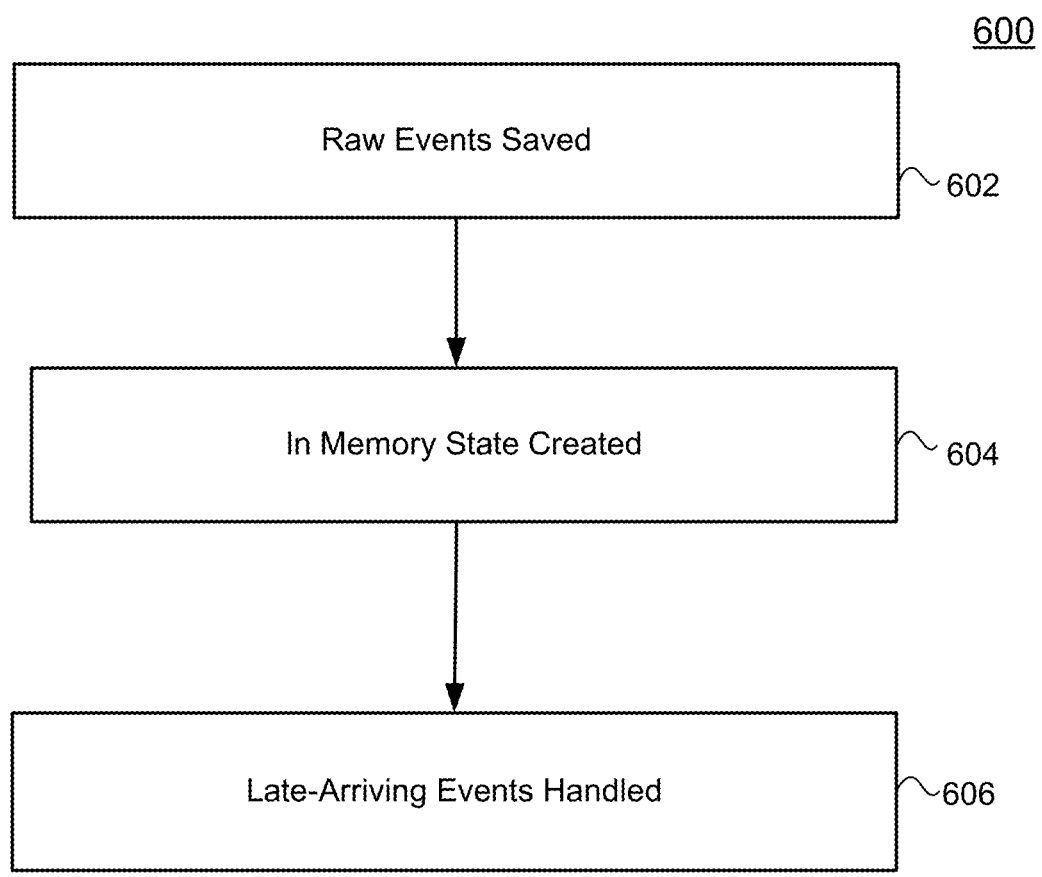
FIG. 6 shows a simplified flow diagram of a method according to the example.

For this particular (digital advertising) example, the solution can be separated into three steps. FIG. 6 is a simplified flow diagram 600 summarizing these steps. In a first step 602, raw events are saved. In a second step 604, an in-memory state is created. In a third step 606 involves the handling of late-arriving events. Details regarding each of these steps are now described below.

Figure 7:
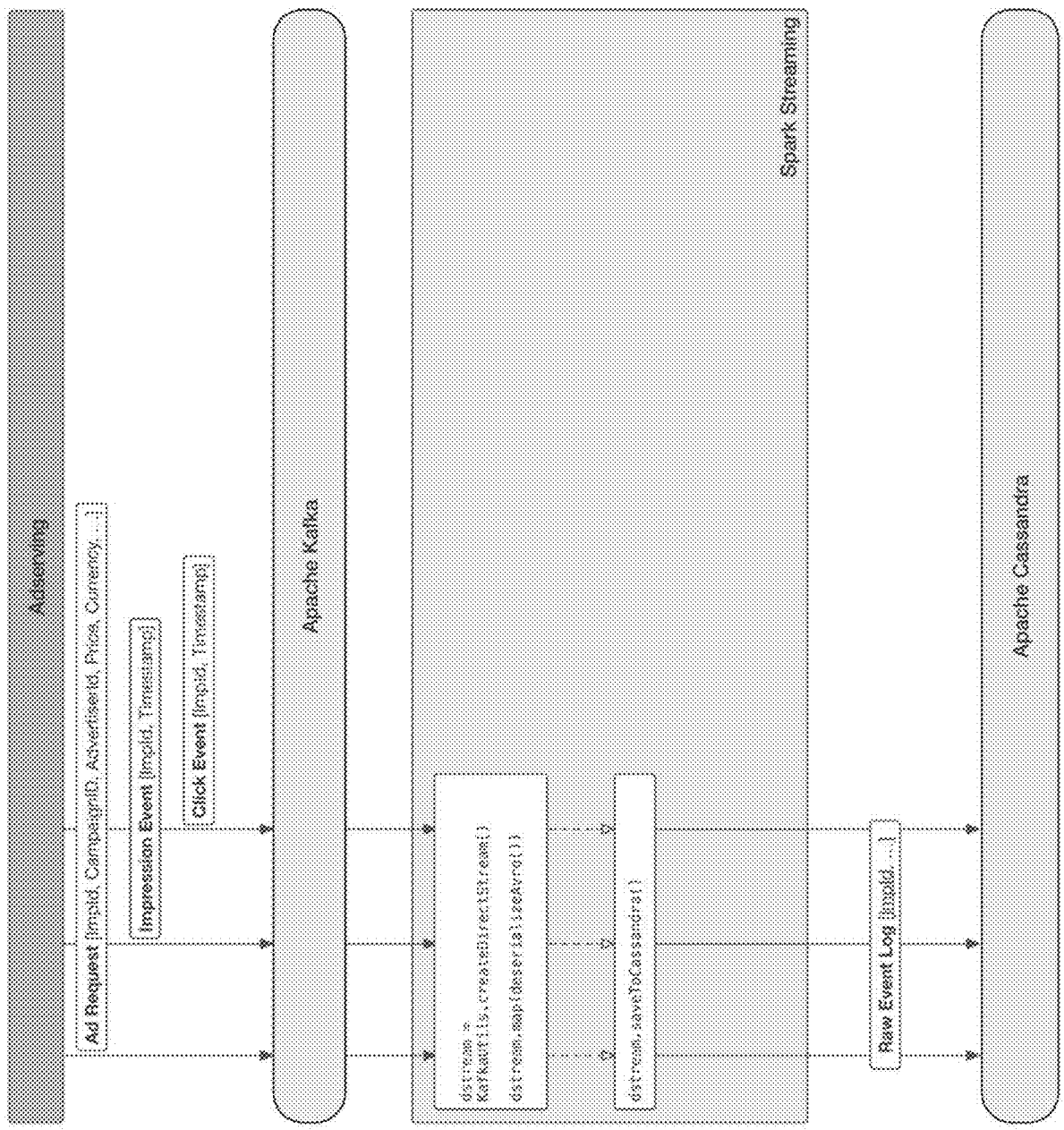
FIGS. 7-8 are simplified views of an exemplary digital advertising system performing event correlation according to the example.

FIG. 7 is a simplified view of the first step, wherein raw events are saved. Specifically all events (both base events and follow-on events) ingested into the Apache KAFKA messaging system, are picked up by the processing jobs based on the large scale Apache SPARK processing framework. More specifically, the ingested events are picked up by the SPARK Executors, and are initially stored in an underlying distributed database (here, Apache CASSANDRA).

Figure 8:
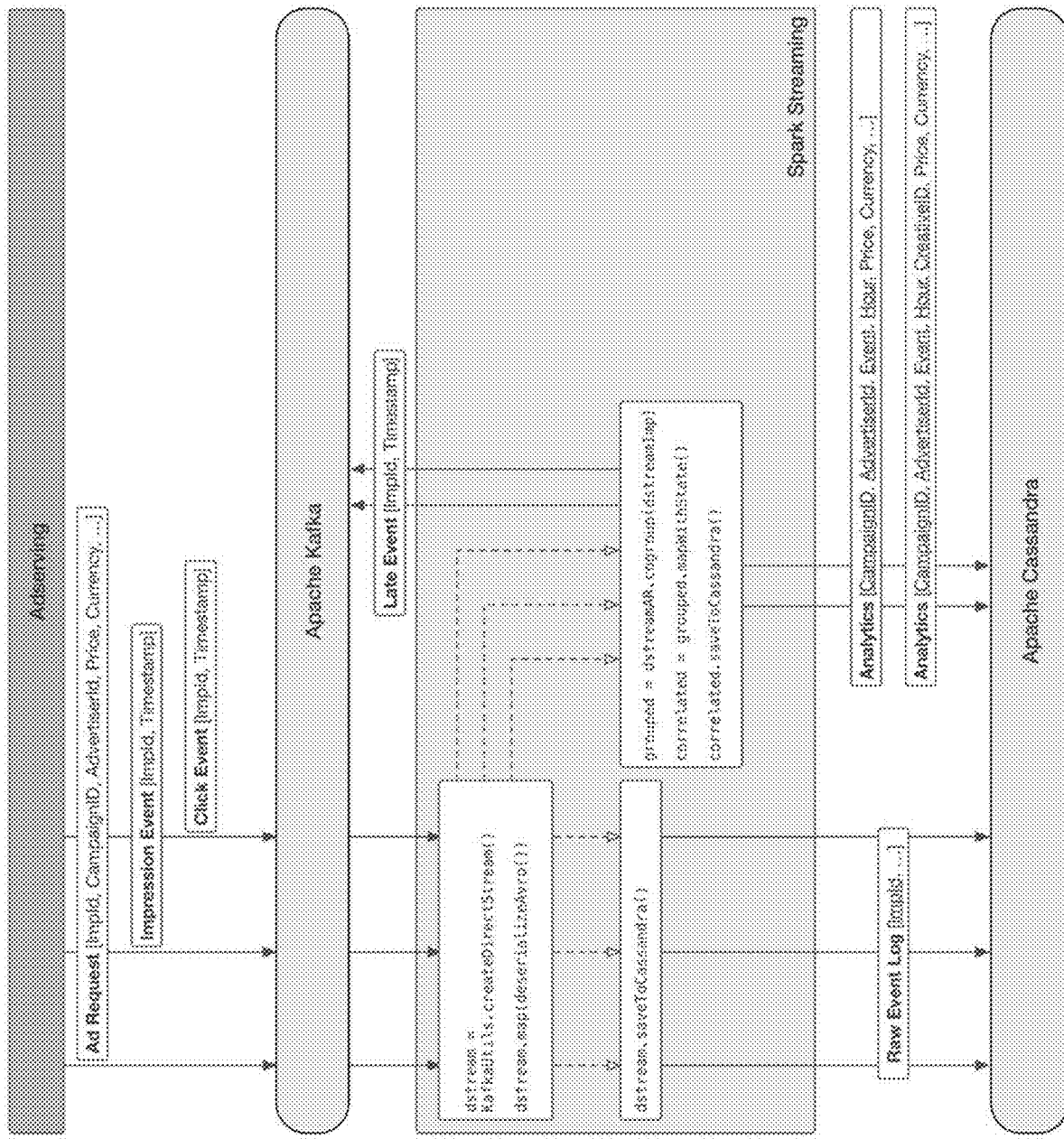

FIG. 8 is a simplified view of the second step. Here, an in-memory state is created on basis of the raw events that have been picked up by the SPARK Executor nodes in the previous step. The different events are grouped by the ID (ImpID) that the events have in common.

If a pair of events has been found (e.g. ad request+impression event or ad request+click event), that pair of events will be:

1) processed further for transformation and storing to an analytical database table that is amenable to rapid and efficient querying; and 2) removed from the in-memory state.

Figure 9:
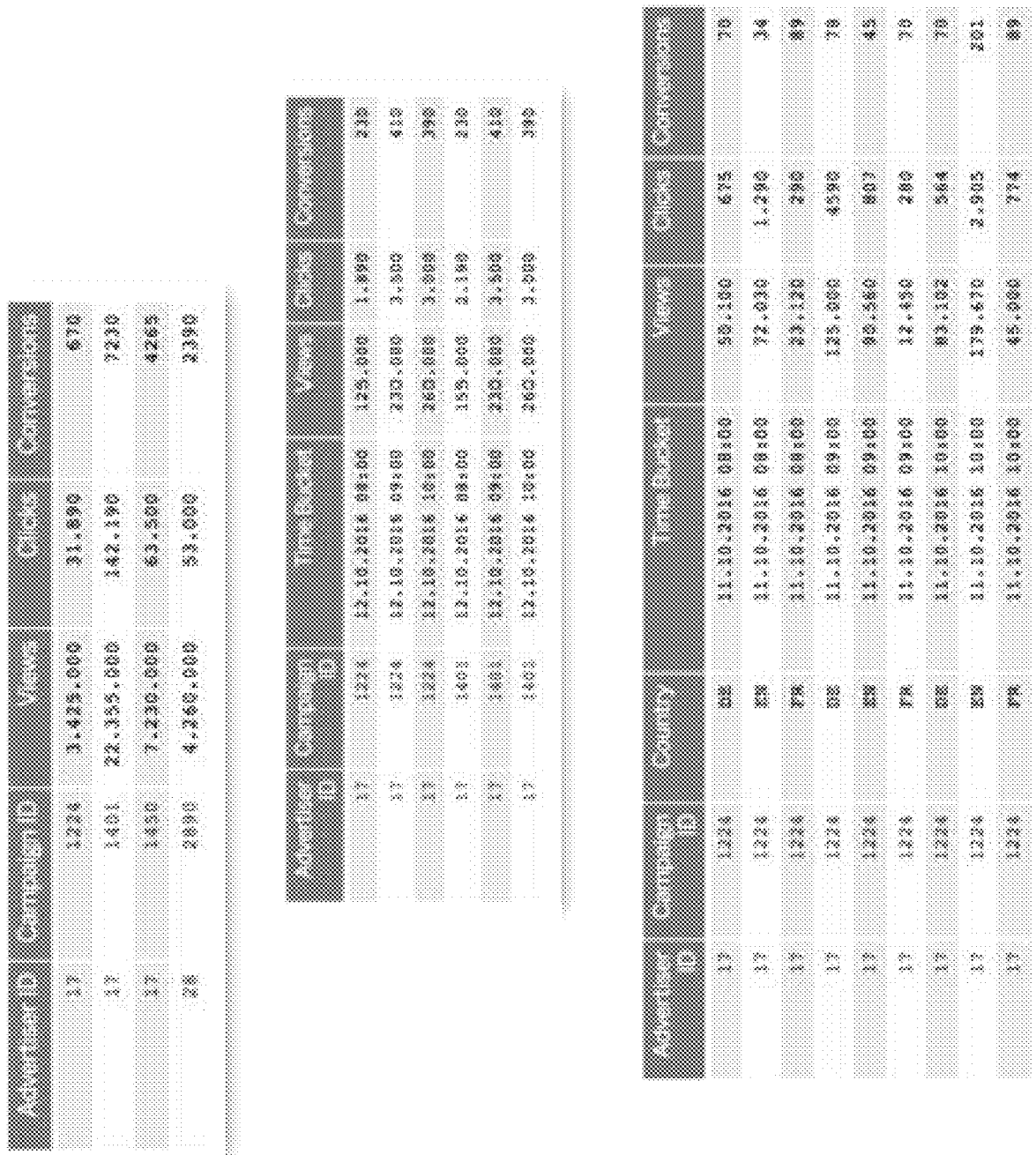
FIG. 9 shows examples of analytical tables comprising digital advertising information.

FIG. 9 shows analytical table examples comprising various types of digital advertising information. In some embodiments, where this successful matching occurs for a majority (e.g., >>95%) of the ingested events, the correlation process according to embodiments may be considered as being efficient.

However, if no matching base event is directly found, the event will remain stored in the in-memory state for a pre-defined time interval window. For example, such a time interval may be preconfigured (e.g., usually 5-60 minutes) depending on the incoming traffic and the available SPARK memory).

Figure 10:
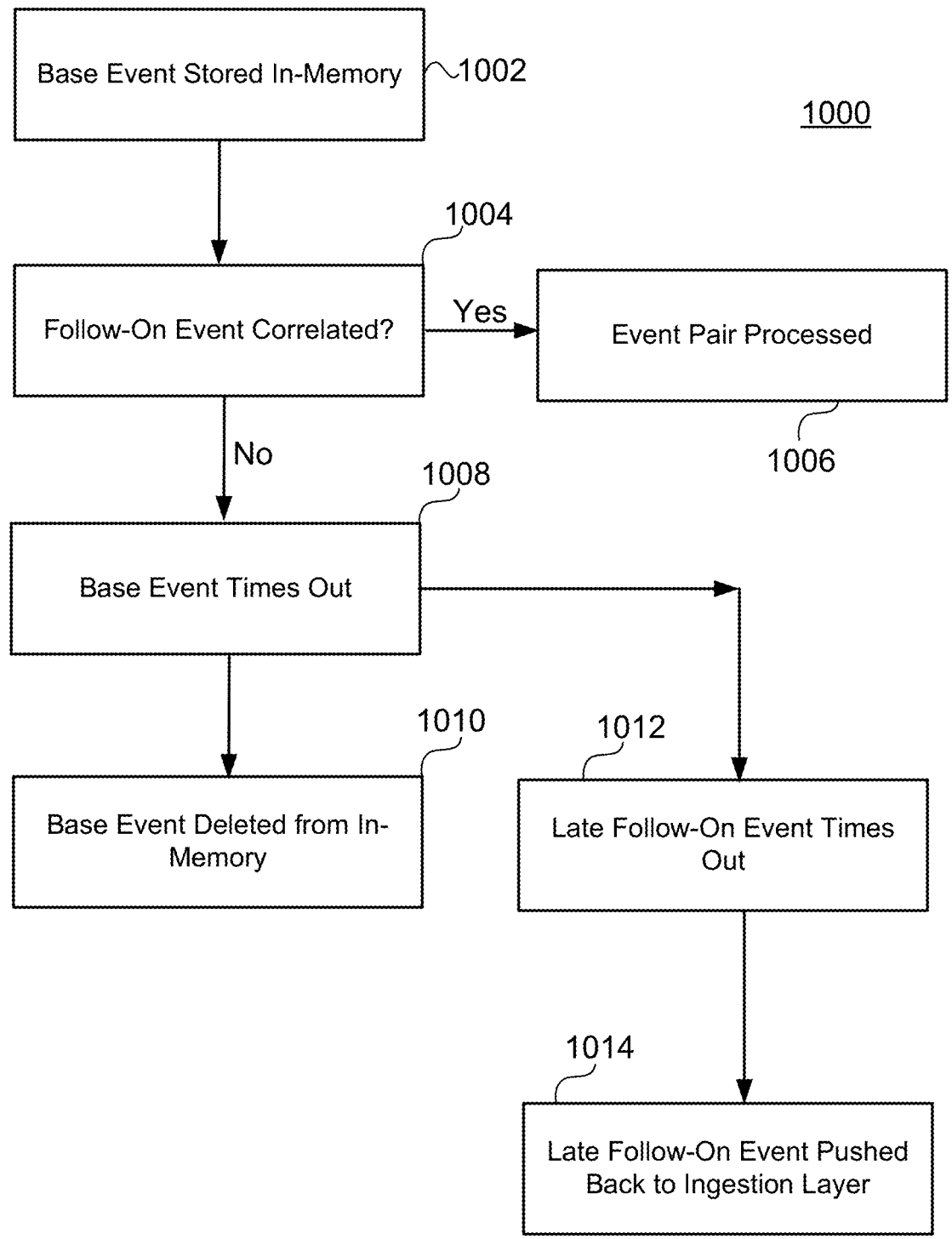
FIG. 10 summarizes a process flow according to the example.

FIG. 10 summarizes a process flow 1000 according to the example. At 1002, a base event is stored in the in-memory state.

If during the pre-defined time interval an event pair is correlated by matching at 1004, that event pair will be processed at 1006 as described above. That is, the relevant data of that event pair will be stored in an analytical table of the persistence layer, and removed from the in-memory state.

If, however, during this pre-defined time interval an event pair is not correlated by matching, then one of two paths are possible.

First, at 1008 if the base (Ad Request) event times out—e.g., no follow-on (impression, click, conversion) event arrives on the system during the pre-defined time interval—at 1010 the Ad Request is deleted from the in-memory state. This is because the probability of a subsequent follow-on event still arriving, becomes relatively low. This first path may occur, for example, when a user receiving an impression of a displayed ad, has already moved on without further action. Under such circumstances it is impossible to trigger a click event.

A second path arises when follow-on (e.g., impression, click or conversion) events time out at 1012. This may occur, for example, when a late event arrives at the system and the Ad Request has already been removed from the in-memory state as described in the first path. This second path can arise where the follow-on event is a conversion event, taking place long after the original base (Ad Request) event.

Under this second processing path, it is not possible to match the events in-memory. Thus at 1014 (and as shown in the upward arrows in FIG. 8), the follow-on events are pushed back to the messaging system to be processed in a different way, from a different job.

Figure 11:
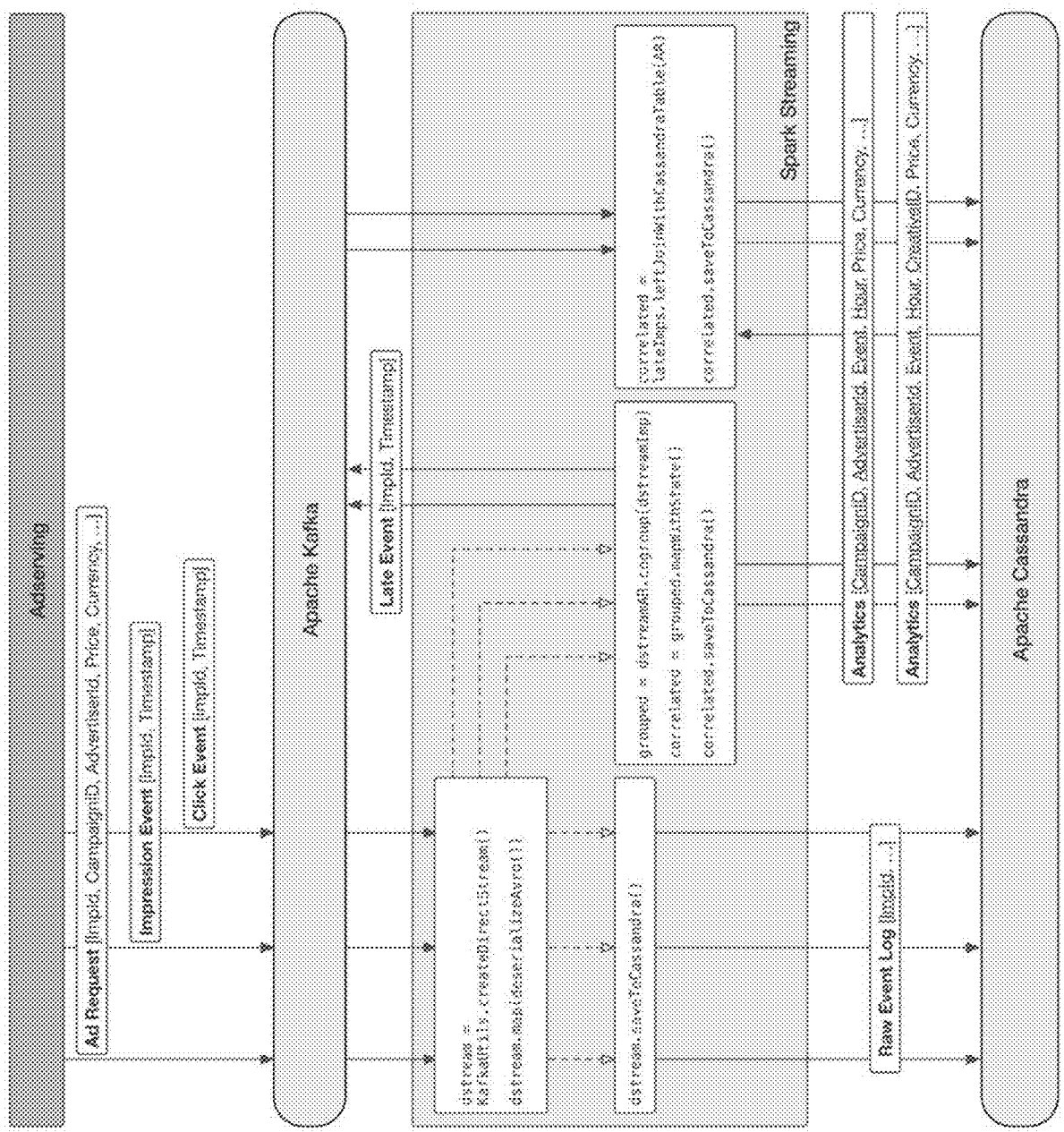
FIG. 11 is a simplified view of the exemplary digital advertising system performing event correlation according to the example.

The third step of FIG. 6 handles the late-arriving follow-on events as just described. A separate SPARK job listens on the message channel only for late events. The separate SPARK job consumes these late events, and joins every event against the raw records in the database that were stored in the initial step 1. FIG. 11 is a simplified view showing the system linking late events, by joining them against entries from the database.

It is known that the majority of incoming events would be follow-on events for recent base events. Thus late events not able to be correlated with an existing in-memory base event by matching, would expected to be rare (e.g., <<5% of all events). So, despite the expense of conducting the join operation of step 3 against the distributed NoSQL database, the overall performance (e.g., speed, efficiency) of the digital advertising system would not be expected to be significantly impacted by step 3.

It is noted that the above example operates based upon the application of a single pre-determined in-memory window time interval, based upon the timestamp of the base event. However, this is not required and alternative embodiments could implement multiple pre-determined time intervals depending upon the nature of the received event. For example, a longer time interval could be specified where the received event is a click action, with the expectation that the next follow-up event (conversion) may happen (if at all) at some relatively distant point in time.

While the above example has specifically focused upon efficient handling of data streamed in connection with a digital advertising environment, embodiments are not limited to this or any other particular context. For example, certain embodiments could be configured to handle data streamed from Internet of Things (IoT) devices. There, the base event could comprise an initial sensor reading from a particular device in a network, with follow-on events comprising subsequent readings from that same IoT device.

In still another embodiment, the base event could comprise an anomalous IoT sensor reading indicative of a failure or some other extraordinary occurrence. Follow-on events could comprise subsequent readings expected to provide further evidence of a failure, or the ramifications of such a failure actually occurring.

Moreover, while the above example has specifically shown the processing layer as being implemented utilizing the SPARK framework, this is also not required. Alternative embodiments could utilize a processing layer based upon other frameworks.

For example, some embodiments could employ the HANA in-memory database system available from SAP SE of Walldorf, Germany, as the processing layer. Such an embodiment could leverage the processing power of the in-memory database engine to efficiently perform the matching and grouping functions with data in the in-memory state stored within the HANA in-memory database.

Figure 12:
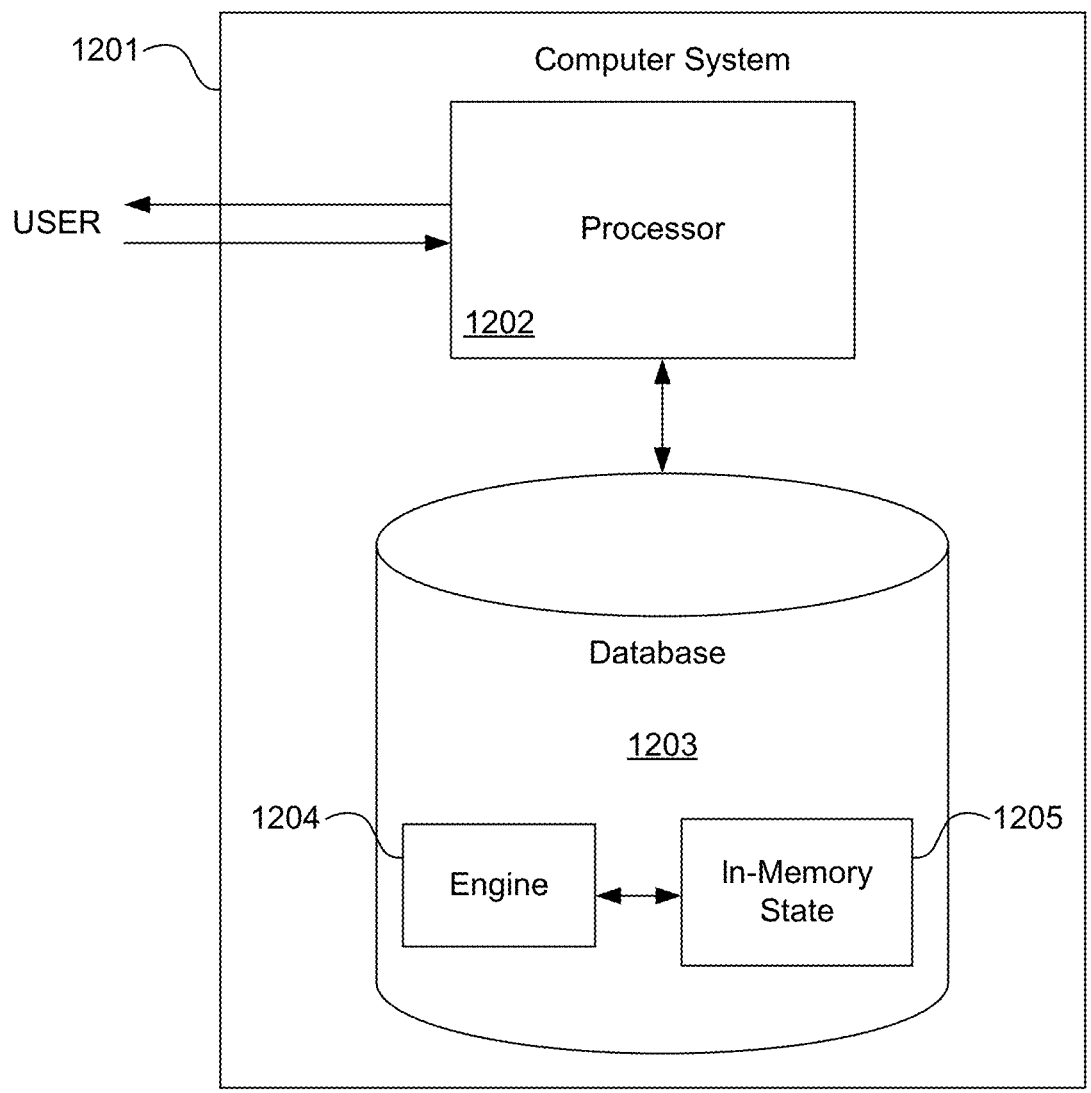
FIG. 12 illustrates hardware of a special purpose computing machine according to an embodiment that is configured to implement event correlation.

FIG. 12 illustrates hardware of a special purpose computing machine configured to implement privacy-preserving benchmarking according to an embodiment. In particular, computer system 1201 comprises a processor 1202 that is in electronic communication with a non-transitory computer-readable storage medium comprising a database 1203. This computer-readable storage medium has stored thereon code 1205 corresponding to an in-memory state. Code 1204 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1805. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    an engine receiving at a first time, a base event;
    the engine storing the base event in a log table of a persistence layer;
    the engine storing the base event in an in-memory state;
    the engine receiving at a second time after the first time, a first follow-on event;
    the engine storing the first follow-on event in the log table;
    the engine storing the first follow-on event in the in-memory state;
    within a predetermined time period, the engine correlating the follow-on event as relevant to the base event to create an event pair;
    the engine storing an aggregation table comprising the base event and the follow-on event as the event pair;
    after expiry of the predetermined time period, the engine deleting the base event and the follow-on event from the in-memory state; and
    the engine satisfying a query with reference to the aggregation table.

2. A method as in claim 1 wherein the correlating comprises the engine matching an identifier in the base event with the identifier in the first follow-on event.

3. A method as in claim 1 wherein the base event comprises a first time stamp, and the follow-on event comprises a second time stamp.

4. A method as in claim 3 wherein the predetermined time is calculated from the first time stamp.

5. A method as in claim 1 wherein the base event and the first follow-on event are received from an ingestion layer, the method further comprising:
    the engine receiving at a third time after expiry of the predetermined time, a second follow-on event from the ingestion layer;
    the engine storing the second follow-on event in the log table;
    the engine storing the second follow-on event in the in-memory state;
    the engine recognizing the second follow-on event as relevant to the base event;
    the engine forwarding the second follow-on event back to the ingestion layer;
    the engine receiving the second follow-on event as a different job from the ingestion layer; and
    the engine satisfying the query with further reference to the log table.

6. A method as in claim 5 wherein:
    the correlating comprises the engine matching an identifier in the base event with the identifier in the first follow-on event;
    the second follow-on event includes the identifier; and
    the engine recognizes the second follow-on event as relevant to the base event due to the identifier.

7. A method as in claim 1 wherein the aggregation table is stored in the persistence layer.

8. A method as in claim 1 wherein the in-memory state is in an in-memory database outside the persistence layer.

9. A method as in claim 8 wherein the engine is an in-memory database engine.

10. A method as in claim 1 wherein:
    the base event comprises an initial reading from an Internet-of-Things (IoT) sensor; and
    the first follow-on event comprises a subsequent reading from the IoT sensor.

11. A non-transitory computer readable storage medium embodying a computer program for performing a method, said method comprising:
    an engine receiving at a first time, a base event including an identifier;
    the engine storing the base event in a log table of a persistence layer;
    the engine storing the base event in an in-memory state;

the engine receiving at a second time after the first time, a first follow-on event including the identifier;

the engine storing the first follow-on event in the log table;

the engine storing the first follow-on event in the in-memory state;

within a predetermined time period, the engine correlating the follow-on event as relevant to the base event to create an event pair by matching the identifier in the base event with the identifier in the first follow-on event;

the engine storing an aggregation table comprising the base event and the follow-on event as the event pair;

after expiry of the predetermined time period, the engine deleting the base event and the follow-on event from the in-memory state; and the engine satisfying a query with reference to the aggregation table.

12. A non-transitory computer readable storage medium as in claim 11 wherein the aggregation table is stored in the persistence layer.

13. A non-transitory computer readable storage medium as in claim 11 wherein the base event and the first follow-on event are received from an ingestion layer, the method further comprising:

the engine receiving at a third time after expiry of the predetermined time, a second follow-on event from the ingestion layer;

the engine storing the second follow-on event in the log table;

the engine storing the second follow-on event in the in-memory state;

the engine recognizing the second follow-on event as relevant to the base event;

the engine forwarding the second follow-on event back to the ingestion layer;

the engine receiving the second follow-on event as a different job from the ingestion layer; and the engine satisfying the query with further reference to the log table.

14. A non-transitory computer readable storage medium as in claim 11 wherein:

the second follow-on event includes the identifier; and the engine recognizes the second follow-on event as relevant to the base event due to the identifier.

15. A non-transitory computer readable storage medium as in claim 11 wherein:

the in-memory state comprises an in-memory database; and the engine comprises an in-memory database engine.

16. A computer system comprising:

one or more processors;

a software program, executable on said computer system, the software program configured to cause an in-memory database engine to:

receive at a first time, a base event;

store the base event in a log table of a persistence layer;

store the base event in an in-memory state within an in-memory database;

receive at a second time after the first time, a first follow-on event;

store the first follow-on event in the log table;

store the first follow-on event in the in-memory state;

within a predetermined time period, correlate the follow-on event as relevant to the base event to create an event pair;

store an aggregation table comprising the base event and the follow-on event as the event pair;

after expiry of the predetermined time period, delete the base event and the follow-on event from the in-memory state; and satisfy a query with reference to the aggregation table.

17. A computer system as in claim 16 wherein the aggregation table is stored in the persistence layer.

18. A computer system as in claim 16 wherein the aggregation table is stored in the in-memory database.

19. A computer system as in claim 16 wherein the base event and the first follow-on event are received from an ingestion layer, the software program configured to further cause an in-memory database engine to:

receive at a third time after expiry of the predetermined time, a second follow-on event from the ingestion layer;

store the second follow-on event in the log table;

store the second follow-on event in the in-memory state;

recognize the second follow-on event as relevant to the base event;

forward the second follow-on event back to the ingestion layer;

receive the second follow-on event as a different job from the ingestion layer; and satisfy the query with further reference to the log table.

20. A computer system as in claim 19 wherein the software program is configured to cause the in-memory database engine to:

correlate by matching an identifier in the base event with the identifier in the first follow-on event; and recognize the second follow-on event as relevant to the base event due to the identifier being in the second follow-on event.

* * * * *